June 20, 1944.  S. G. WELBURY  2,351,892
LATHE AND LATHE TOOL
Filed Dec. 11, 1940    2 Sheets-Sheet 1

Stanley G. Welbury
By
Watson, Cole, Grindle & Watson
ATTYS.

June 20, 1944.                S. G. WELBURY                2,351,892
                            LATHE AND LATHE TOOL
                           Filed Dec. 11, 1940            2 Sheets-Sheet 2

Stanley G. Welbury
By
Watson, Cole, Grindle & Watson
Attys.

Patented June 20, 1944

2,351,892

UNITED STATES PATENT OFFICE 2,351,892

LATHE AND LATHE TOOL

Stanley Garthwaite Welbury, Sheffield, England, assignor to Darwins Limited, Sheffield, England Application December 11, 1940, Serial No. 369,647
In Great Britain December 12, 1939

6 Claims. (Cl. 82—25)

This invention relates to lathes and lathe tools its object generally being to provide improved means for clearing casual excrescences and other undesired matter from the surface of a rotating work piece, particularly at and adjacent a shoulder thereof formed by a circumferential collar, flange or the like.

A principal object of the invention is to provide improved means for the removal of the fash or burr which is apt to be left on the cylindrical surface of a projectile or the like by the machining of copper or brass bands thereon.

Another object is to provide means for movably mounting and resiliently supporting a lathe tool and to limit the depth of cut thereof by a part, movable with the tool, adapted to operate as a stop by contact with work in the lathe.

A further object is to provide means for removing casual excrescences and the like from the axially extending surface of rotating work which varies in diameter or concentricity.

Another object is to enable the tool to be maintained in contact with the work under a predetermined pressure sufficient to complete the desired clearing operation without damage to the work proper.

Another object is to provide means for enabling the cutting edge of a lathe tool to operate upon one region of the work and the stop, hereinbefore referred to limiting the depth of cut, to operate upon another region of the work. For this purpose the cutting edge may be spaced apart in an axial direction from the part adapted to operate as a stop so that the latter may contact with a portion of the work which is free from undesired excrescences.

Although the part of the tool which is adapted to operate as a stop may comprise two separated points or two rollers it is preferably a face on the tool adapted to obtain a bearing on the work along at least one axially extending line of contact. The cutting edge and the line of contact may both be contained in the same radial plane of the work and, particularly for use on cylindrical and conical surfaces, they may be both contained in the same straight line.

In a modification, however, the cutting edge of the tool is contained in a plane at right angles to the axis of the work in the lathe and may be constituted by the edge of a cutter wheel, disc or the like rotatably mounted on the tool. In this case the part of the tool adapted to operate as a stop is conveniently provided by an arc-shaped face thereon co-axial with the cutter wheel.

A further object is to provide means for simultaneously removing undesired excrescences from both sides of a circumferential collar or projecting band of the work.

A still further object is to provide an improved combination of tool holder and tools by the employment of which a circumferential collar, such as a copper or brass band on a projectile, may be machined and the fash or burr thereby produced may be removed in one traverse of the tool holder towards the work.

Another object is to bring a forming tool into operative position and to machine a circumferential collar of the work at one stage of the traverse of a tool holder towards the work, to move the forming tool into an inoperative position wholly clear of the work at a subsequent stage of such traverse and, at a still later stage, to bring a fash or burr removing tool into operative position.

Another object is to give a cushioned indication to the operator when the desired depth of cut of a lathe tool has been completed.

Other objects will appear from the following description of the drawings, in which.

Like reference numerals indicate like parts throughout the several figures of the drawings.

Figure 1:
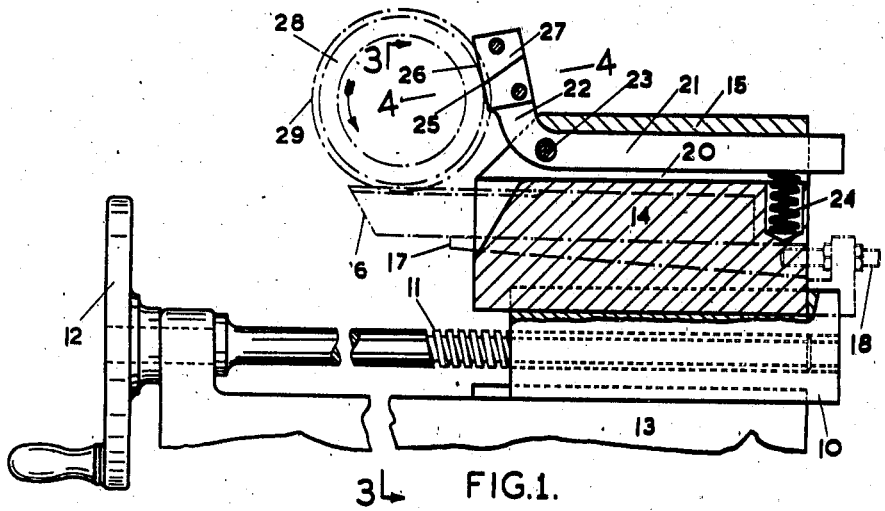
Figure 1 is a sectional elevation illustrating a combined lathe tool and holder therefor according to the present invention in position on the cross slide of a lathe.

With reference first to Figures 1, 2, 3 and 4 a cross-slide 10 of conventional design is movable by the screw 11 and hand-wheel 12 on the lathe bed 13 and a tool holder comprising a lower portion 14 and an upper portion 15 is secured by any desired means to the cross-slide 10.

The lower portion 14 of the tool holder is formed with a central slot or channel containing a forming tool 16 supported on a wedge 17 which is adjustable lengthwise by means of a screw 18. The upper portion 15 of the tool holder is secured to the lower portion 14 by the screws 19 and is formed with two slots or channels 20, one on each side of the central slot of the lower portion 14.

Figures 2, 4:
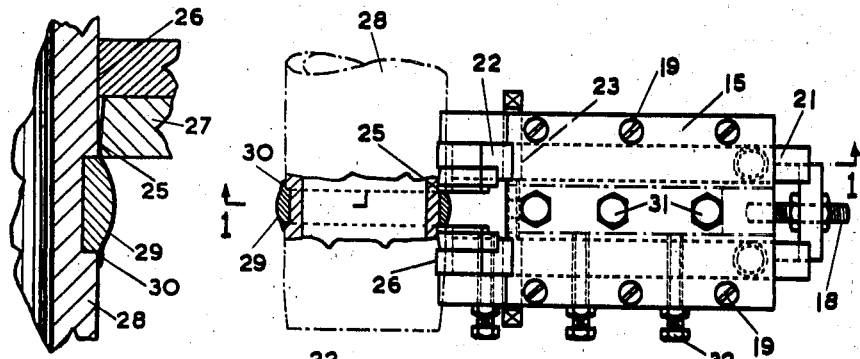
Figure 2 is a plan of Figure 1 partly in section, omitting the cross-slide and lathe bed.
Figure 4 is an enlarged sectional plan of parts on the radial plane indicated by the line 4—4 in Figure 1, one of the lathe tools being omitted.
Figure 3:
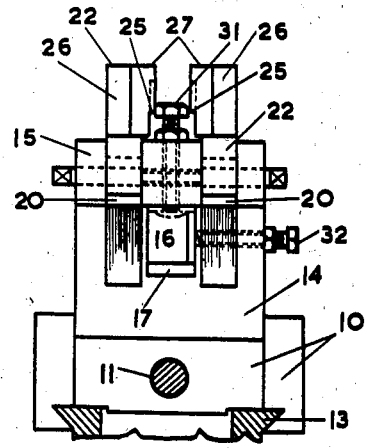
Figure 3 is a sectional end view on the line 3—3 of Figure 1.

In each of the slots 20 a lathe tool in the form of a bent lever having two arms 21 and 22 is fulcrumed at or about the bend as indicated at 23. One arm of the lever is situated within the slot 20 and rests upon a spring 24, rubber pad or the like which provides a resilient support for the lathe tool. The other arm 22 of the lever extends outside the tool holder slot 20 and, as best seen in Figures 3 and 4, has a cutting edge 25 and a bearing face 26 adapted to operate as a stop by contact with work in the lathe. The face 26 is provided by a plane surface on the arm 22 and the cutting edge 25 is formed on a block 27 which is screwed to the side of the arm 22. The block 27 is preferably of high speed steel although, if desired, tungsten carbide or other cutting alloy may be used to provide the cutting edge 25. As shown clearly in Figure 4 the cutting edge 25 is spaced apart axially from the face 26 by means of a chamfered formation of the block 27 and the face 26 is capable of obtaining a bearing on the work along an axially extending line of contact which is in alignment with the cutting edge 25.

The work illustrated consists of a projectile 28 fitted with a copper or brass band 29. When such a band is machined to the desired contour, such as that illustrated in Figure 4 for example, a fash or burr is very apt to be left on the cylindrical surface of the projectile 28 is indicated at 30 in Figure 4. Although such machining of the band 29 may be independently performed it is effected, in the embodiment of the invention illustrated in Figures 1, 2, 3 and 4, by means of the forming tool 16 which is adjusted by the aid of the wedge 17 and secured in the adjusted position by the clamping screws 31 and 32. The parts are so arranged and adjusted that, as the cross-slide 10 with the combined tool holder and tools which it carries is advanced towards the work by the hand-wheel 12, the edge of the forming tool 16 first operates, on the lower portion of the band 29, as the work rotates in the lathe in the direction of the arrow, and then passes to an inoperative position on the other side of the work, as shown in Figure 1, before the cutting edge 25 of the lathe tool comes into operation. In order that the forming tool 16 may be clear of the band 29 when its edge has passed below the work and reached an inoperative position, the portion of the forming tool adjacent its edge is inclined slightly to the direction of travel of the holder 14, 15 in the cross-slide 10, as shown in Figure 1, so that a widening gap is formed between the work and this portion of the forming tool as the latter is advanced beyond the point at which its edge reaches an inoperative position beyond the work.

The fash 30 produced by the forming tool 16 will, however, intersect the path of the cutting edge 25 as the tool holder advances further towards the rotating work into the position shown in Figure 1. During the later stages of advance of the tool holder towards the work the fash 30 is removed by the cutting edge 25 and when thus removed the face 26 on the arm 22 makes contact with the cylindrical body 28 of the projectile thereby acting as a stop and limiting the depth of cut made by the edge 25, the axial distance between the cutting edge 25 and the face 26 being such that the latter bears upon a part of the work to which the fash or burr 30 does not extend. Since the tool 21, 22 is movably mounted on its fulcrum 23 and resiliently supported by the spring 24, the stiffness of which is preferably sufficient to hold the cutting edge 25 to its work in removing the fash or burr 30, the work will not be damaged even if the tool holder is advanced slightly after contact of the face 26 with the work to compress the spring 24, the tool then operating as a scraper or burnisher under a pressure determined by the stiffness of the spring 24, whilst any slight eccentricity of the work surface will not prevent the removal of the fash from around the complete circumference.

It will be understood that although only one of the fash removing tools with the cutting edge 25 and bearing face 26 is shown in Figure 4 the other tool shown in Figures 2 and 3 will operate in a similar manner on the other side of the band 29, the cutting edges 25 being spaced apart by a distance equal to the width of the finished band 29 and each operating between that band and one of the bearing faces or stops 26.

Figure 5:
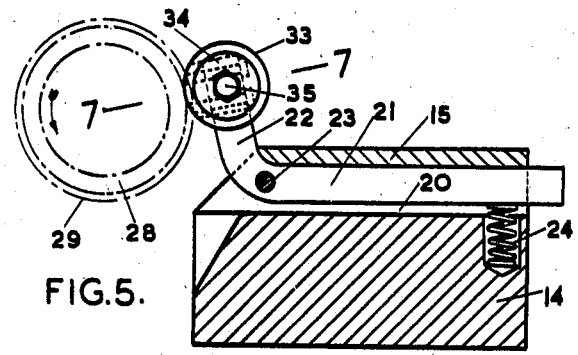
Figure 5 is a sectional elevation of a modification.
Figure 7:
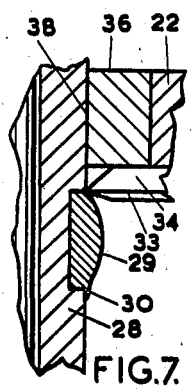
Figure 7 is an enlarged sectional plan of parts on the radial plane indicated by the line 7—7 in Figure 5, one of the lathe tools being omitted.
Figure 6:
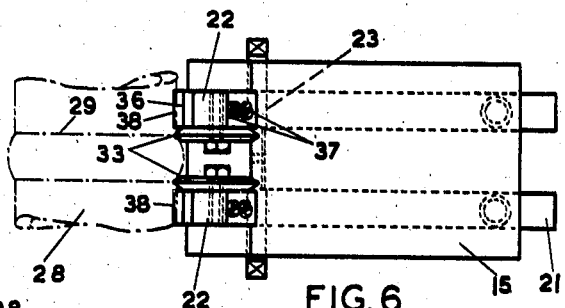
Figure 6 is a plan of Figure 5.

In the modification illustrated in Figures 5, 6 and 7 the lathe tool comprises a bent lever 21, 22 fulcrumed at 23 in the slot 20 of the portion 15 of the tool holder and resiliently supported by the spring 24 similarly to the corresponding parts shown in Figure 1, but the cutting edge is constituted by the periphery 33 of a cutter wheel, disc or the like 34 journaled at 35 to the arm 22 of the bent lever.

The arm 22 also carries a part adapted to operate as a stop by contact with work in the lathe and, in the construction illustrated, a block 36 is secured by a screw 37 to the arm 22 and has an arc-shaped face 38 forming the stop. The parts are so proportioned and fitted that the arc-shaped bearing face or stop 38 is co-axial with and of the same radius as the cutting edge 33 but, as shown in Figures 6 and 7, is spaced axially apart therefrom.

Two of the lathe tools are shown mounted in the tool holder portion 15 with their cutting edges 33 spaced apart by the width of the soft metal band 29 on the projectile 28.

It will be understood that although not shown in Figures 5, 6 and 7 a forming tool such as the one 16 illustrated in Figure 1 to machine the band 29 may be mounted in the lower portion 14 of the tool holder or the band 29 may be machined by other means.

The operation is similar to that described with reference to Figures 1, 2, 3 and 4, the cutting edge 33, which is at right angles to the axis of the work 28, 29, separating the fash or burr 30 from the band 29 and the depth of cut being limited by contact of the arc shaped face 38 with the projectile body 28.

Figure 8:
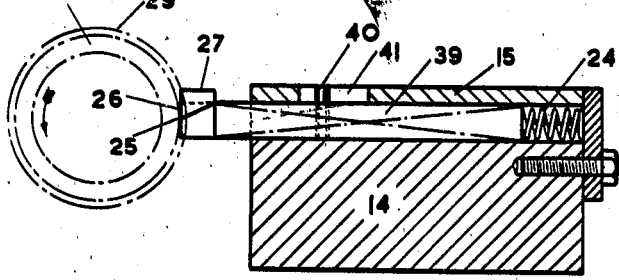
Figure 8 is a sectional elevation of another modification.
Figure 9:
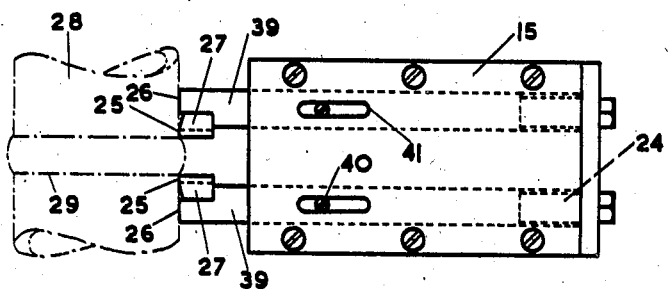
Figure 9 is a plan of Figure 8.

In the modification illustrated in Figures 8 and 9 the lathe tool comprises a bar 39 slidable longitudinally in guides between the lower part 14 and the upper part 15 of the tool holder. The end of the tool remote from the work is biased by a spring 24 tending to move its other end, which carries the cutting edge 25 and bearing face 26, towards the work which consists, in the example illustrated, of a projectile 28 fitted with a copper or brass band 29. The cutting edge 25 which is formed on the block 27 and the bearing face 26 are similar in form and operation to those described with reference to Figures 1, 2, 3 and 4 except that the bearing face 26 which constitutes the stop limiting the depth of cut by contact with the work is provided by the end of the bar 39. The sliding movement of the lathe tool in relation to its holder is limited by any desired means such as by a pin 40 on the bar 39 engaging a slot 41 in the upper portion 15 of the tool holder.

Two of the lathe tools are shown slidably mounted in the tool holder in Figure 9 with their cutting edges 25 spaced apart by the width of the soft metal band 29 on the projectile 28 and, as in the case of the modification illustrated in Figures 5, 6 and 7, a forming tool such as the one illustrated in Figure 1 to machine the band 29 may be mounted in the lower portion 14 of the tool holder.

In addition to removing the fash or burr 30 the cutting edge 25 or cutter 34 may also be used to shape the end surface of the band 29 which projects beyond the cylindrical surface of the projectile 28.

An additional function of the resilient mounting of the tool 21, 22 combined with the stop provided by the face 26 or 36 is to give the operator a cushioned indication when the desired depth of cut performed by the cutting edge 25 or 33 has been completed.

What I claim is:

1. In a lathe means for trimming the edges of an annular portion of a piece of work, said annular portion being of limited axial extent as compared with the whole length of the work, said means comprising, in combination, a tool holder, means for traversing said holder transversely of the lines of centers of the lathe to take a cut, two lathe tools each having a cutting edge adapted to operate upon the respective sides of said annular portion and each having a face adapted to operate as an end stop to limit the cut by contact with the work in the lathe, means for movably mounting said tools in the holder with their cutting edges a predetermined axial distance apart and between the faces adapted to operate as stops and means for resiliently supporting said tools in the holder.

2. In a lathe the combination of a tool holder, a lathe tool having a cutting edge and a face adapted to operate as a stop by contact with work in the lathe to limit the depth of cut, means for movably mounting the tool in the holder, means for resiliently supporting the tool in the holder, a cross-slide, means for traversing the holder therein, and a forming tool so mounted in the holder that as the holder is traversed towards the work the edge of the forming tool first operates on the work and then passes across a diameter thereof at right angles to the cross-slide to an inoperative position and at a subsequent stage of the holder traverse the movably mounted and resiliently supported lathe tool operates on the work.

3. In a lathe the combination of a tool holder, a lathe tool having a cutting edge and a face adapted to operate as a stop by contact with work in the lathe to limit the depth of cut, means for movably mounting the tool in the holder, means for resiliently supporting the tool in the holder, a cross slide, means for traversing the holder therein and a forming tool so mounted in the holder that as the holder is traversed towards the work the edge of the forming tool first operates on the work and then passes across a diameter thereof at right angles to the cross-slide to an inoperative position with the portion of said forming tool adjacent its edge wholly clear of the work and at a subsequent stage of the holder traverse the movably mounted and resiliently supported lathe tool operates on the work.

4. In a lathe the combination of a tool holder, a lathe tool having a cutting edge and a face adapted to operate as a stop by contact with work in the lathe to limit the depth of cut, means for movably mounting the tool in the holder, means for resiliently supporting the tool in the holder, a cross-slide, means for traversing the holder therein, and a forming tool so mounted in the holder that as the holder is traversed towards the work the edge of the forming tool first operates on the work and then passes across a diameter thereof at right angles to the cross-slide to an inoperative position the portion of said forming tool adjacent its edge and facing the work being inclined to the direction of travel of the tool holder in the cross-slide and at a subsequent stage of the holder traverse the movably mounted and resiliently supported lathe tool operates on the work.

5. In a lathe the combination of a tool holder, two lathe tools each having a cutting edge and each having a face adapted to operate as a stop by contact with work in the lathe to limit the depth of cut, means for movably mounting said tools in the holder with their cutting edges a predetermined axial distance apart and between the parts adapted to operate as stops, means for resiliently supporting said tools in the holder, a cross-slide, means for traversing the holder therein and a forming tool so mounted in the holder that as the holder is traversed towards the work the edge of the forming tool first operates on the work and then passes across a diameter thereof at right angles to the cross-slide to an inoperative position and at a subsequent stage of the holder traverse the movably mounted and resiliently supported lathe tools operate on the work.

6. In a lathe the combination of a tool holder, a lathe tool having a cutting edge and a face spaced apart from said cutting edge in an axial direction as regards the lathe and adapted to operate as a stop by bearing on work in the lathe along at least one axially extending line of contact to limit the depth of cut, the cutting edge and the line of contact both being contained in the same radial plane of the work, a bent lever of which one arm carries said cutting edge and said face, means for fulcruming said lever adjacent the bend to the tool holder, a spring biasing the other arm of the lever to move the first arm towards the work, a cross-slide, means for traversing the holder therein, and a forming tool so mounted in the holder that as the holder is traversed towards the work the edge of the forming tool first operates on the work and then passes across a diameter thereof at right angles to the cross-slide to an inoperative position and at a subsequent stage of the holder traverse the movably mounted and resiliently supported lathe tool operates on the work.

STANLEY GARTHWAITE WELBURY.